US012753473B2

(12) United States Patent
Shiseki et al.

(10) Patent No.: US 12,753,473 B2
(45) Date of Patent: Oct. 6, 2026

(54) SOFT MAGNETIC ALLOY POWDER AND PRODUCTION METHOD THEREFOR

(71) Applicant: MITSUBISHI STEEL MFG. CO., LTD., Tokyo (JP)

(72) Inventors: Tetsuji Shiseki, Fukushima (JP); Michitaka Aihara, Fukushima (JP); Keita Kume, Fukushima (JP); Seiichi Saito, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 407 days.

(21) Appl. No.: 18/568,922

(22) PCT Filed: Oct. 24, 2022

(86) PCT No.: PCT/JP2022/039454

§ 371 (c)(1),
(2) Date: Dec. 11, 2023

(87) PCT Pub. No.: WO2023/100528

PCT Pub. Date: Jun. 8, 2023

(65) Prior Publication Data

US 2024/0271259 A1 Aug. 15, 2024

(30) Foreign Application Priority Data

Dec. 3, 2021 (JP) ................................ 2021-197019

(51) Int. Cl.

| | |
|---|---|
| ***C22C 38/34*** | (2006.01) |
| ***B22F 1/00*** | (2022.01) |
| ***B22F 1/16*** | (2022.01) |
| ***B22F 9/08*** | (2006.01) |
| ***C22C 1/04*** | (2023.01) |
| ***C22C 33/02*** | (2006.01) |
| ***C22C 38/00*** | (2006.01) |
| ***C22C 38/04*** | (2006.01) |
| ***H01F 1/147*** | (2006.01) |
| ***H01F 1/20*** | (2006.01) |
| *H01F 1/33* | (2006.01) |

(52) U.S. Cl.

CPC ................ *C22C 38/34* (2013.01); *B22F 1/00* (2013.01); *B22F 1/09* (2022.01); *B22F 1/16* (2022.01); *B22F 9/08* (2013.01); *B22F 9/082* (2013.01); *C22C 1/04* (2013.01); *C22C 33/02* (2013.01); *C22C 33/0264* (2013.01); *C22C 38/002* (2013.01); *C22C 38/04* (2013.01); *H01F 1/147* (2013.01); *H01F 1/14766* (2013.01); *H01F 1/14791* (2013.01); *H01F 1/20* (2013.01); *B22F 2009/0848* (2013.01); *B22F 2207/01* (2013.01); *C22C 33/0278* (2013.01); *C22C 2202/02* (2013.01); *H01F 1/33* (2013.01)

(58) Field of Classification Search

CPC ....................................................... C22C 38/34

See application file for complete search history.

(56) References Cited

U.S. PATENT DOCUMENTS

| | | | | |
|---|---|---|---|---|
| 2011/0267167 A1* | 11/2011 | Ogawa | C22C 1/02 148/284 |
| 2013/0176098 A1 | 7/2013 | Matsuura et al. | |
| 2016/0064136 A1 | 3/2016 | Ogawa | |

FOREIGN PATENT DOCUMENTS

| | | |
|---|---|---|
| JP | 2007-027354 | 2/2007 |
| JP | 2011-49568 | 3/2011 |
| JP | 5093008 | 12/2012 |
| JP | 2016-39331 | 3/2016 |
| JP | 2016-219758 | 12/2016 |
| JP | 2017-107935 | 6/2017 |

OTHER PUBLICATIONS

Supplementary European Search Report for European Application No. 22900961.8 mailed Oct. 11, 2024.
International Search Report and Written Opinion for International Application No. PCT/JP2022/039454 mailed Dec. 13, 2022.

* cited by examiner

*Primary Examiner* — Jophy S. Koshy
(74) *Attorney, Agent, or Firm* — Carlson, Gaskey & Olds, P.C.

(57) ABSTRACT

An Fe—Cr—Si-based soft magnetic alloy powder is provided in which the Cr weight ratio of Cr contained in the alloy powder gradually decreases from the surface of the alloy powder to a predetermined depth in the depth direction, the amount contained of Si is in the range of 3 to 6.5% by weight, the amount contained of Cr may be in the range of 1 to 5% by weight, at least one of Mn, P, S, and O may be further contained, the weight ratio of Cr oxide/metal Cr may gradually decrease from the surface of the alloy powder in the depth direction, and loss in the soft magnetic alloy powder used in a dust core is reduced so as to be able to cope with higher frequencies and larger currents.

7 Claims, 5 Drawing Sheets

(c)

(d)

SOFT MAGNETIC ALLOY POWDER AND PRODUCTION METHOD THEREFOR

TECHNICAL FIELD

The present invention relates to a soft magnetic alloy powder and a production method therefor, and in detail, to an Fe—Cr—Si-based soft magnetic alloy powder used for a dust core, and a production method therefor.

BACKGROUND ART

With the miniaturization and increased functionality of electronic devices, performance so as to cope with higher frequencies and larger currents is required in the magnetic cores of choke coils and inductors provided in electronic devices. In order to cope with higher frequencies and larger currents, it is necessary to reduce loss in a magnetic core. Therefore, a dust core has been provided formed of a soft magnetic alloy powder having high magnetic permeability and low coercive force so as to reduce loss due to hysteresis of magnetization. In the dust core, the soft magnetic alloy material is bonded with an insulating binder, and therefore electrical resistivity is ensured and loss due to eddy current is also reduced. An Fe—Cr—Si-based alloy powder has been provided as a soft magnetic alloy powder that can be used in a dust core to cope with higher frequencies and larger currents (see Patent Literature 1).

CITATION LIST

Patent-Literature

Patent Literature 1: Japanese Unexamined Patent Application Publication No. 2007-027354

SUMMARY OF THE INVENTION

Problems to be Solved by the Invention

However, in order to cope with higher frequencies and larger currents, a soft magnetic alloy capable of forming a dust core with further reduced loss is required.

An object of the present embodiment is to provide a soft magnetic alloy powder that constitutes a dust core and is capable of reducing loss in the dust core and coping with higher frequencies and larger currents, and to provide a production method for the soft magnetic alloy powder.

Means for Solving the Problems

In order to solve the aforementioned problem, a soft magnetic alloy powder according to this application is an Fe—Cr—Si-based soft magnetic alloy powder in which the weight ratio of Cr contained in the alloy powder gradually decreases from the surface of the alloy powder to a predetermined depth in the depth direction.

The amount contained of Si may be in the range of 3 to 6.5% by weight, and the amount contained of Cr may be in the range of 1 to 5% by weight. At least one of Mn, P, S, and O may be further contained.

The weight ratio of Cr oxide/metal Cr may gradually decrease from the surface of the alloy powder in the depth direction.

A production method for an Fe—Cr—Si-based soft magnetic alloy powder according to the present application includes: heating an alloy in a crucible to form a molten metal; and blowing a fluid onto a stream of the molten metal guided to fall from the crucible, to crush and solidify the molten metal and form an alloy powder, in which a portion of Cr contained in the alloy powder is oxidized in forming the alloy powder from the molten metal.

Oxidization may be performed such that the weight ratio of Cr oxide/metal Cr of the Cr contained in the alloy powder gradually decreases from the surface of the alloy powder in the depth direction.

The weight ratio of the Cr contained in the alloy powder may gradually decrease from the surface of the alloy powder to a predetermined depth in the depth direction.

In the alloy formed into the molten metal, the amount contained of Si may be in the range of 3 to 6.5% by weight, and the amount contained of Cr may be in the range of 1 to 5% by weight. The alloy may further contain at least one of Mn, P, S, and O.

Effects of the Invention

According to the present invention, it is possible to form a dust core having little loss that can cope with higher frequencies and larger currents.

DESCRIPTION OF EMBODIMENTS

Figure 1:
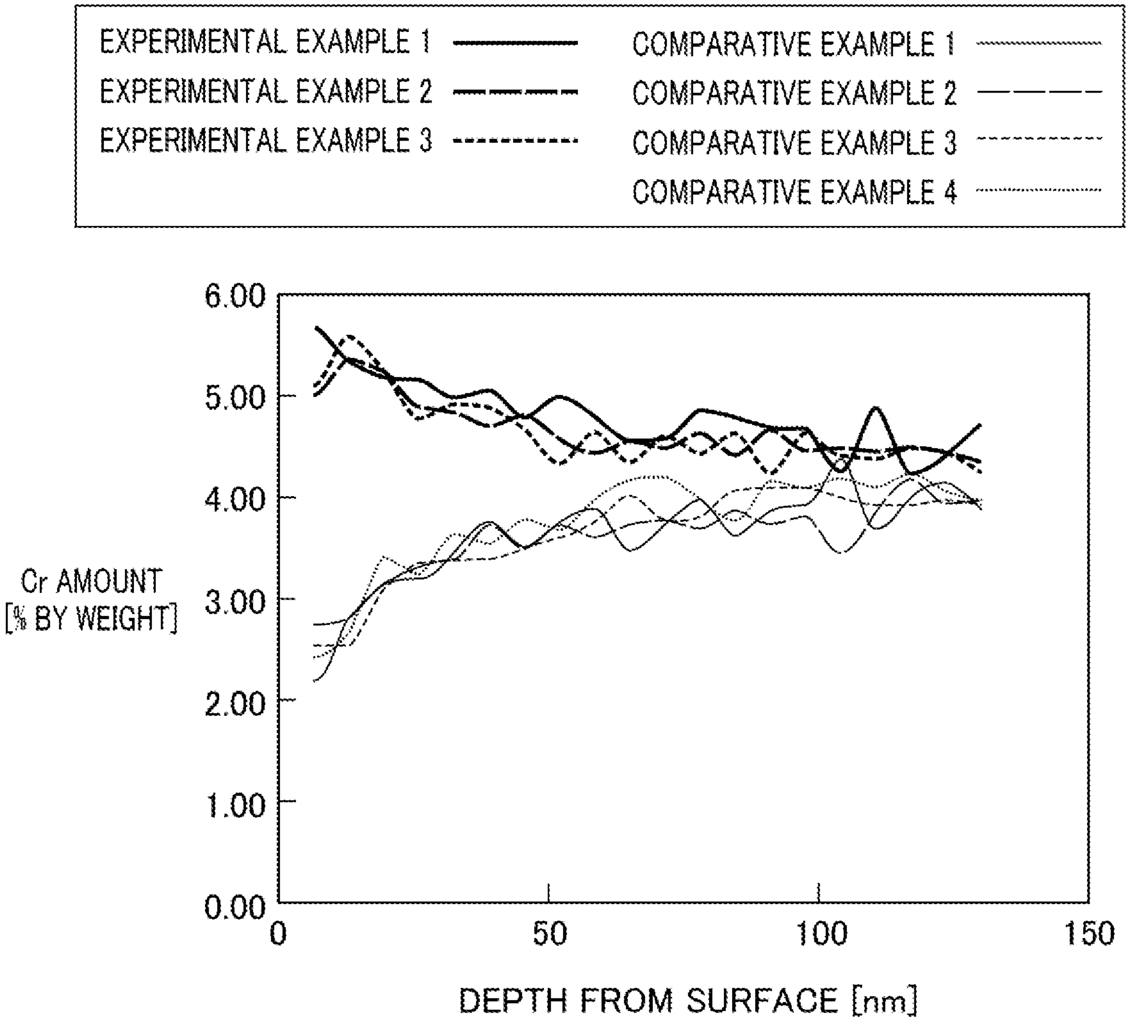
FIG. 1 A graph illustrating the distribution of Cr in the depth direction of soft magnetic alloy powders.

Hereinafter, an embodiment of a soft magnetic alloy powder and a production method therefor will be described in detail with reference to the drawings. In the present embodiment, an Fe—Cr—Si-based alloy is assumed as the alloy constituting the soft magnetic alloy powder. The Fe—Cr—Si-based soft magnetic alloy of the present embodiment is an alloy constituted by adding chromium (Cr) and silicon (Si) to iron (Fe) which is the main component, and the remainder of Cr and Si is composed of Fe except for additives and unavoidable impurities as noted.

The soft magnetic alloy powder of the present embodiment (hereinafter, soft magnetic alloy powder is sometimes also referred to as alloy powder, and soft magnetic alloy is sometimes also referred to as alloy) is produced by an atomization method. First, material constituting an alloy powder is placed in a crucible and heated by a melting furnace to form a molten alloy. In an Fe—Cr—Si-based alloy, Fe is the main component and Cr and Si are added, and carbon (C), manganese (Mn), phosphorus (P), and sulfur (S) may be added. Oxygen (O) may also be added.

In the Fe—Cr—Si-based alloy of the present embodiment, the amount contained of Si may be in the range of 3 to 6.5% by weight. The amount contained of Cr may be in the range of 1 to 5% by weight. The amount contained of C may be in the range of 0.003 to 0.02% by weight, may be in the range of 0.005 to 0.017% by weight, or may be in the range of 0.007 to 0.015% by weight. The amount contained of Mn may be in the range of 0.01 to 0.1% by weight, may be in the range of 0.015 to 0.08% by weight, or may be in the range of 0.017 to 0.07% by weight. The amount contained of P may be in the range of 0.001 to 0.009% by weight, may be in the range of 0.002 to 0.006% by weight, or may be in the range of 0.0025 to 0.005% by weight. The amount contained of S may be in the range of 0.001 to 0.009% by weight, may be in the range of 0.002 to 0.006% by weight, or may be in the range of 0.0025 to 0.005% by weight. The amount contained of O may be 2500 wt. ppm or less.

Next, the molten alloy is guided to a nozzle from a hole formed at the bottom of the crucible, to form a stream of molten alloy falling from the nozzle. A jet flow of a fluid such as water or gas is blown onto the falling molten alloy, and the molten alloy is crushed and solidified to form an alloy powder. In the present embodiment, the alloy powder is formed from the molten alloy, and the molten alloy, which is pulverized into droplets, is oxidized. Therefore, oxygen may be contained in the fluid blown onto the stream of the falling molten alloy, or oxygen may be contained in the atmosphere in which the molten alloy falls.

With such a production method, alloy powders were prepared from alloys of different compositions of Experimental Examples 1 to 3 as shown in Table 1 below. Note that the compositions of alloy powders of Comparative Examples 1 to 4 are also shown in Table 1. Comparative Examples 1 to 4 were prepared by a production method similar to that of the present embodiment except that droplets of molten alloy were not oxidized in the step of blowing a jet flow of a fluid onto the molten alloy falling from the nozzle to form an alloy powder.

TABLE 1

| | C [%] | Si [%] | Mn [%] | P [%] | S [%] | Cr [%] | Fe [%] |
|---|---|---|---|---|---|---|---|
| Experimental Example 1 | 0.01 | 3.96 | 0.03 | 0.003 | 0.003 | 4.64 | Remainder |
| Experimental Example 2 | 0.01 | 3.88 | 0.04 | 0.003 | 0.003 | 4.63 | Remainder |
| Experimental Example 3 | 0.01 | 4.00 | 0.03 | 0.003 | 0.004 | 4.46 | Remainder |
| Comparative Example 1 | 0.01 | 3.91 | 0.07 | 0.004 | 0.007 | 4.33 | Remainder |
| Comparative Example 2 | 0.01 | 4.03 | 0.02 | 0.003 | 0.003 | 4.33 | Remainder |
| Comparative Example 3 | 0.01 | 3.91 | 0.03 | 0.005 | 0.005 | 4.54 | Remainder |
| Comparative Example 4 | 0.01 | 2.91 | 0.03 | 0.003 | 0.004 | 4.39 | Remainder |

Table 2 shows the results of measuring the concentration of O, median diameter $D_{50}$, tap density, specific surface area, and coercive force of Experimental Examples 1 to 3. Table 2 also shows the measurement results for Comparative Examples 1 to 3. Here, the median diameter $D_{50}$ is the diameter of the alloy powder in the center when the alloy powder is arranged in order of the size of the diameter. The tap density is the density measured by placing the alloy powder in a container and tapping the container to fill gaps within the alloy powder. The specific surface area is the surface area per weight of the alloy powder.

TABLE 2

| | O [ppm] | $D_{50}$ [μm] | Tap density [g/cm$^3$] | Specific surface area [m$^2$/g] | Coercive force Hc [A/m] |
|---|---|---|---|---|---|
| Experimental Example 1 | 2300 | 5.6 | 4.15 | 0.33 | 565 |
| Experimental Example 2 | 2200 | 6.0 | 4.21 | 0.35 | 581 |
| Experimental Example 3 | 1500 | 11.3 | 4.62 | 0.22 | 461 |
| Comparative Example 1 | 2800 | 5.4 | 4.12 | 0.52 | 710 |
| Comparative Example 2 | 1600 | 10.8 | 4.60 | 0.32 | 672 |
| Comparative Example 3 | 1800 | 10.7 | 4.47 | 0.43 | 694 |
| Comparative Example 4 | 1800 | 10.5 | 4.37 | 0.37 | 714 |

Comparing Experimental Examples 1 to 3 and Comparative Examples 1 to 4 in Table 2, it is observed that the concentration of O, median diameter $D_{50}$, tap density, and specific surface area have similar values. However, the coercive force Hc is in the range of 461 to 581 [A/m] in Experimental Examples 1 to 3, whereas the coercive force Hc is 672 to 714 [A/m] in Comparative Examples 1 to 4. Thus, it is observed that the coercive force Hc is notably reduced in the alloy powders prepared according to the production method of the present embodiment. Since the coercive force Hc decreases in Experimental Examples 1 to 3, the loss due to hysteresis of magnetization of the dust cores formed by the alloy powders of Experimental Examples 1 to 3 is notably reduced.

FIG. 1 is a graph illustrating the distribution of Cr in the depth direction of the alloy powders. In FIG. 1, the distribution of the Cr amount from the surface of the alloy powder to a depth of approximately 130 nm was measured by X-ray photoelectron spectroscopy (XPS). In Experimental Examples 1 to 3, it is observed that the Cr amount gradually decreases in the depth direction from the surface of the powder, saturates when reaching a certain depth of approximately 50 to 70 nm, and thereafter transitions at a substantially constant value. In contrast, in Comparative Examples 1 to 4, it is observed that the Cr amount starts from a smaller value than in Experimental Examples 1 to 3 at the surface of the alloy powder, and gradually increases and then saturates when reaching a certain depth of approximately 50 to 70 nm and thereafter transitions at a substantially constant value, but the value at which the Cr amount transitions at a constant value is slightly smaller than the value at which the Cr amount transitions at a substantially constant value in Experimental Examples 1 to 3.

As described above, in Experimental Examples 1 to 3, the droplets of the molten alloy are oxidized in the step of forming the alloy powder from the molten alloy, whereas in Comparative Examples 1 to 4, oxidization is not carried out in the step of forming the alloy powder from the alloy. Therefore, it is thought that the distribution in the depth direction of the Cr amount in the alloy powders of Experimental Examples 1 to 3, in other words, the distribution in which the Cr amount gradually decreases in the depth direction from the surface of the powder and then saturates, was formed due to the process of oxidizing the droplets of the molten alloy.

Figure 2:
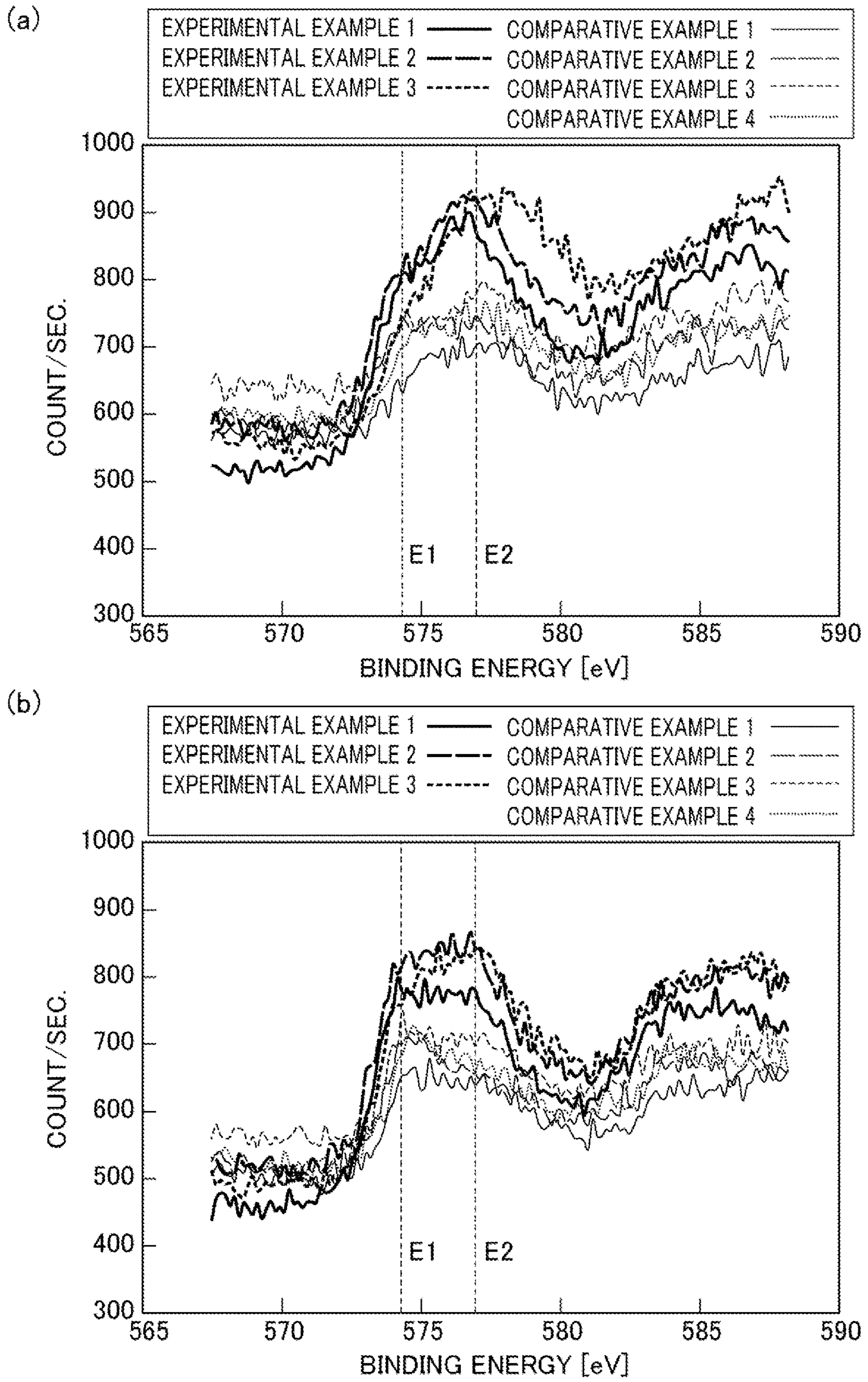
FIG. 2 A graph illustrating the distribution of the XPS spectrum of Cr in the depth direction of soft magnetic alloy powders.
Figure 3:
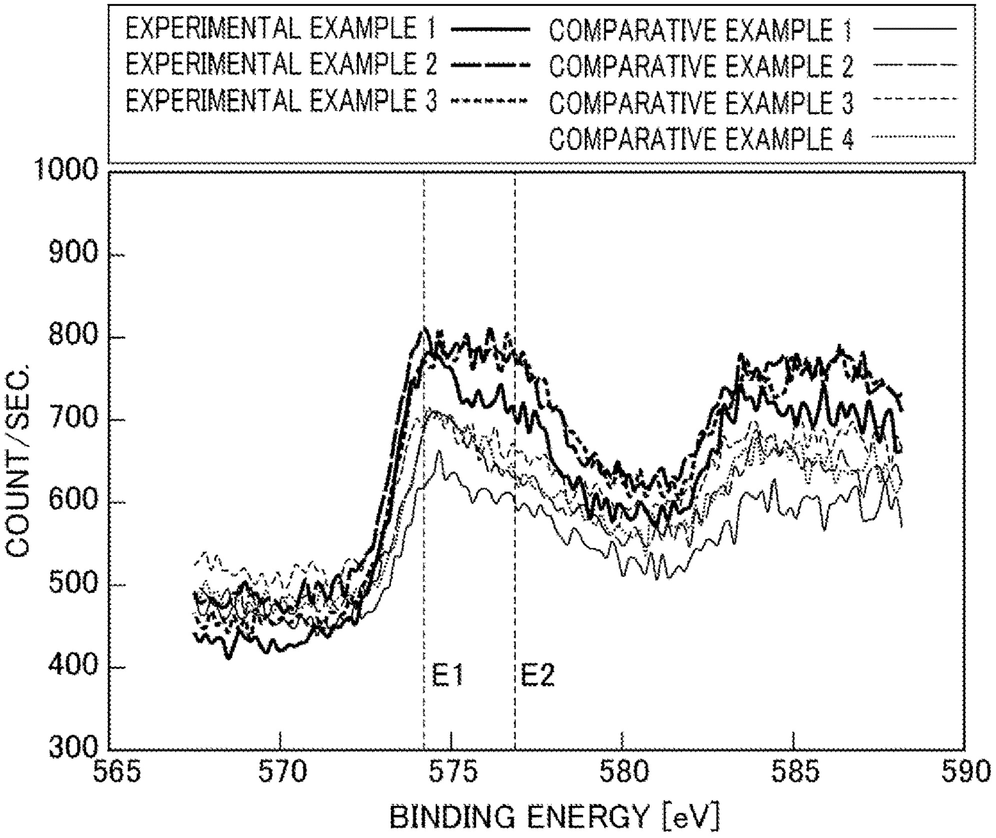
FIG. 3 This graph is a continuation of FIG. 2.
Figure 3:
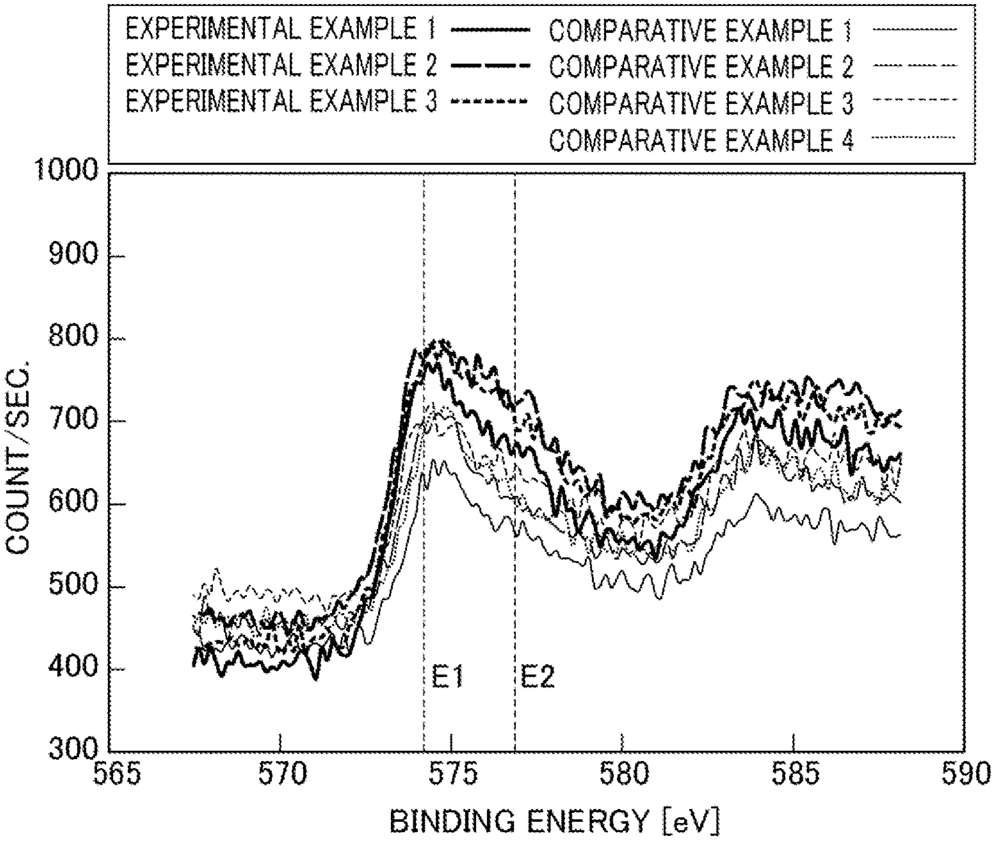
Figure 4:
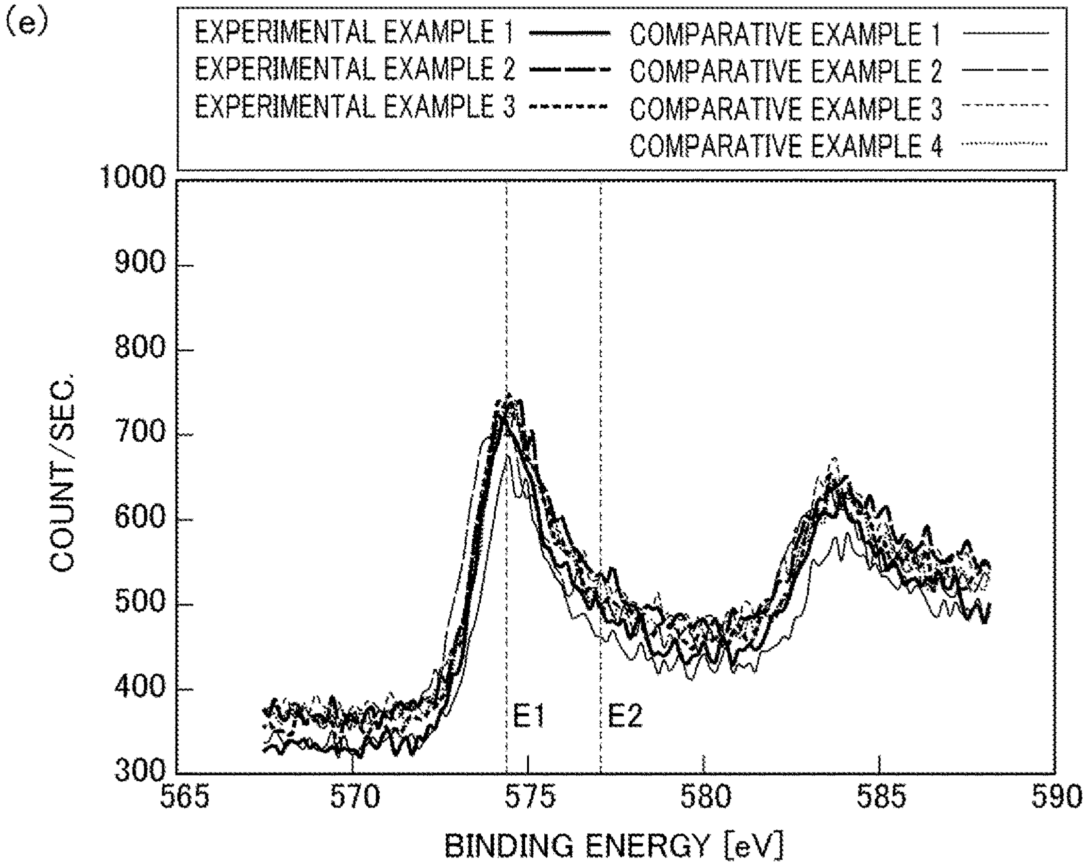
FIG. 4 This graph is a continuation of FIG. 3.

FIGS. 2 to 4 are graphs illustrating the distribution of the XPS spectrum of Cr in the depth direction of the alloy powders. FIG. 2(*a*) shows the XPS spectrum of Cr at a depth of 6.5 nm, FIG. 2(*b*) at a depth of 13 nm, FIG. 3(*c*) at a depth of 19.5 nm, FIG. 3(*d*) at a depth of 26 nm, and FIG. 4(*e*) at a depth of 130 nm from the surface of the alloy powder. Note that the depth of the alloy powder is according to $SiO_2$ conversion.

In each graph, the binding energy of metal Cr is shown as E1 and the binding energy of Cr oxide is shown as E2. Referring to FIGS. 2(*a*) to 4(*e*), in Experimental Examples 1 to 3, at a depth of 6.5 nm in FIG. 2(*a*), Cr oxide is greater than metal Cr in terms of the ratio thereof in the Cr, but as the depth increases in FIGS. 2(*a*) to 4(*e*), metal Cr gradually increases in terms of the ratio thereof in the Cr. At a depth of 13 nm in FIG. 2(*b*), the ratio of Cr oxide is still greater than that of metal Cr, but at a depth of 19.5 nm and thereafter in FIG. 3(*c*), the ratio of metal Cr becomes greater than that of Cr oxide.

In Comparative Examples 1 to 4 also, the trend of metal Cr gradually increasing in terms of the ratio thereof in the Cr as the depth increases in FIGS. 2(*a*) to 4(*e*) is similar to that in Experimental Examples 1 to 3. However, there is a difference in that the ratio of metal Cr is already greater than that of Cr oxide at a depth of 13 nm in FIG. 2(*b*). Compared with such Comparative Examples 1 to 4, in Experimental Examples 1 to 3, it can be said that there is advanced oxidation of Cr in a surface layer from the surface of the alloy powder to a certain depth.

As described above, in Experimental Examples 1 to 3, the droplets of the molten alloy are oxidized in the step of forming the alloy powder from the molten alloy, while in Comparative Examples 1 to 4, the powder is not oxidized in the step of forming the alloy powder from the alloy. Therefore, in the alloy powders of Experimental Examples 1 to 3, it is thought that the oxidation of Cr proceeds from the surface in this step, and the amount of Cr oxide in the surface layer becomes greater than that in Comparative Examples 1 to 4.

Figure 5:
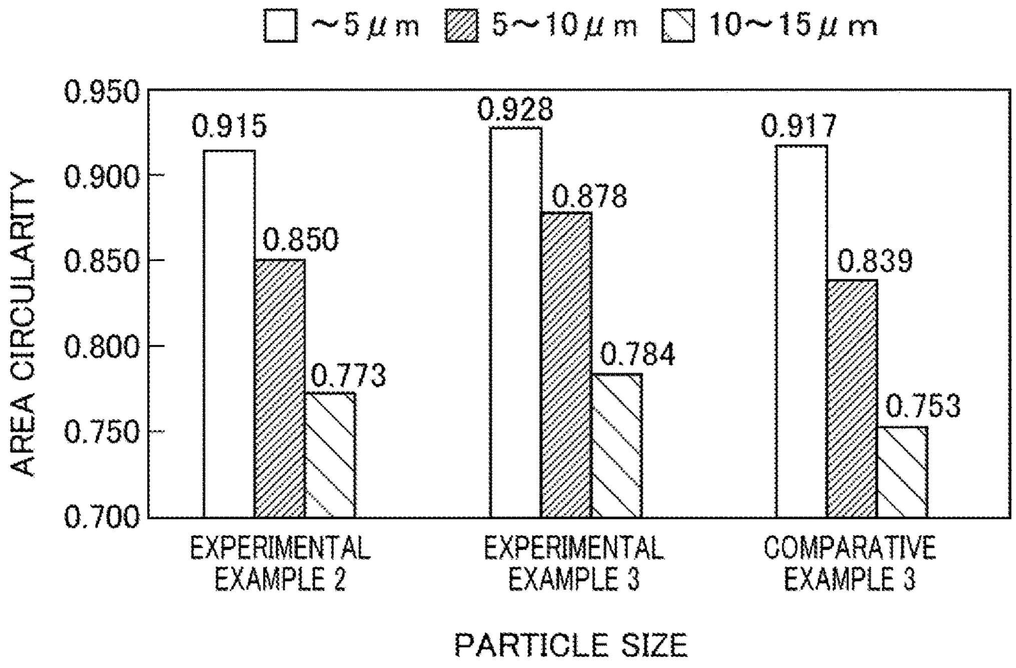
FIG. 5 A graph illustrating the area circularity of soft magnetic alloy powders.

FIG. 5 is a graph illustrating the area circularity of alloy powders obtained by image analysis. Referring to FIG. 5, for an alloy powder having a diameter smaller than 5 μm, it is observed that the area circularities of Experimental Examples 2 and 3 and Comparative Example 3 are similar values of approximately 9.2, but in the range where the diameter is 5 μm or more and less than 10 μm and the range where the diameter is 10 μm or more, the area circularities of both Experimental Examples 2 and 3 are larger than the area circularity of Comparative Example 3. This is thought to be because, in Experimental Examples 2 and 3, alloy droplets were formed in powders having a high circularity due to the ratio of Cr oxide in the Cr in the surface layer being large and the strong bonding force of Cr oxide in the surface layer.

Figure 6:
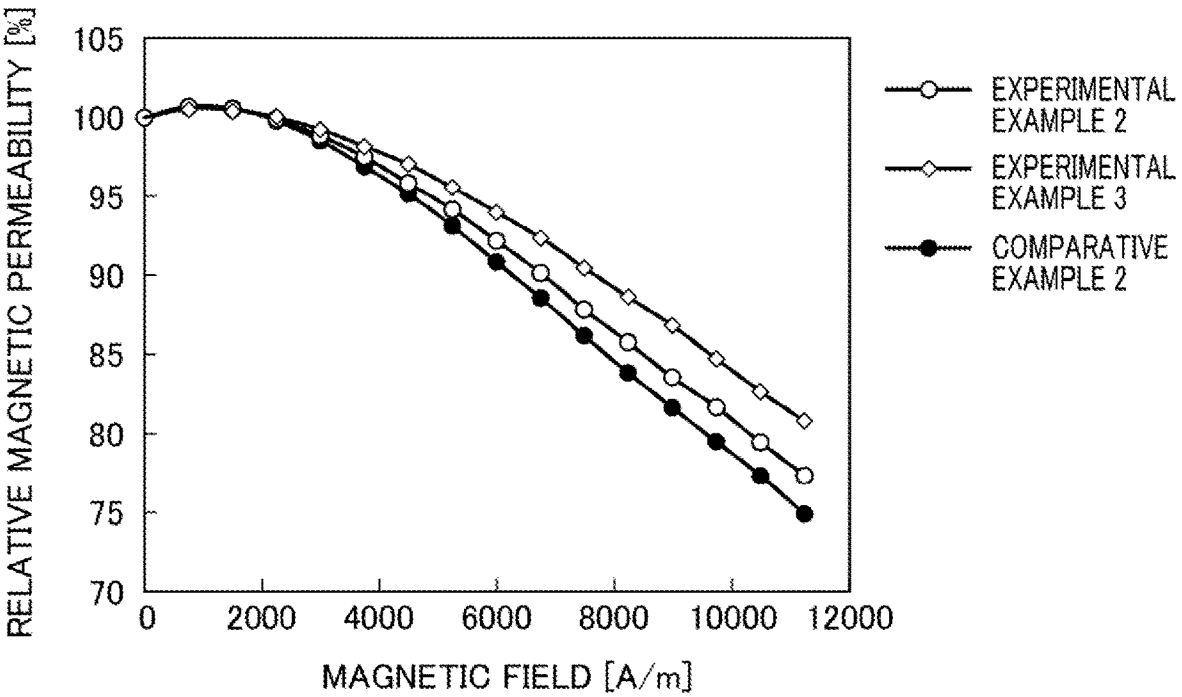
FIG. 6 A graph illustrating the dependence of the relative magnetic permeability of soft magnetic alloy powders on the magnetic field.

FIG. 6 is a graph illustrating results of measuring the DC superposition characteristics of the alloy powders. The drawing shows measurement data of Experimental Examples 2 and 3 and Comparative Example 2 used in FIG. 5. In the graph, the horizontal axis is the magnetic field, and the vertical axis is the relative magnetic permeability with 100 being when no magnetic field is applied. Referring to the drawing, it is observed that the measurement data of Experimental Examples 2 and 3 and Comparative Example 2 increases to maximum values before reaching 1000 [A/m] as the magnetic field increases, and then decreases monotonically to near 12000 [A/m]. Furthermore, it is also observed that the relative magnetic permeability of Experimental Examples 2 and 3 and Comparative Example 2 are almost equal until the magnetic field is approximately 2000 [A/m], but when approximately 2000 [A/m] is exceeded, the relative magnetic permeability of Experimental Examples 2 and 3 is larger than the magnetic permeability of Comparative Example 2 up to near 12000 [A/m], which is the upper limit of the measurement range. Therefore, it can be said that Experimental Examples 2 and 3 have favorable DC superposition characteristics in that the decrease in magnetic permeability is small regardless of an increase in the strength of the magnetic field corresponding to DC current.

In this way, the alloy powders of Experimental Examples 2 and 3 have more favorable DC superposition characteristics than the alloy powder of Comparative Example 2. Such DC superposition characteristics of Experimental Examples 2 and 3 are thought to be due to the high circularities of the alloy powders of Experimental Examples 2 and 3 as shown in FIG. 5. A dust core formed with an alloy powder of the present embodiment, such as that of Experimental Examples 2 and 3, can ensure magnetic permeability by suppressing a decrease in magnetic permeability even when a large current is applied, and therefore loss can be reduced.

Figure 7:
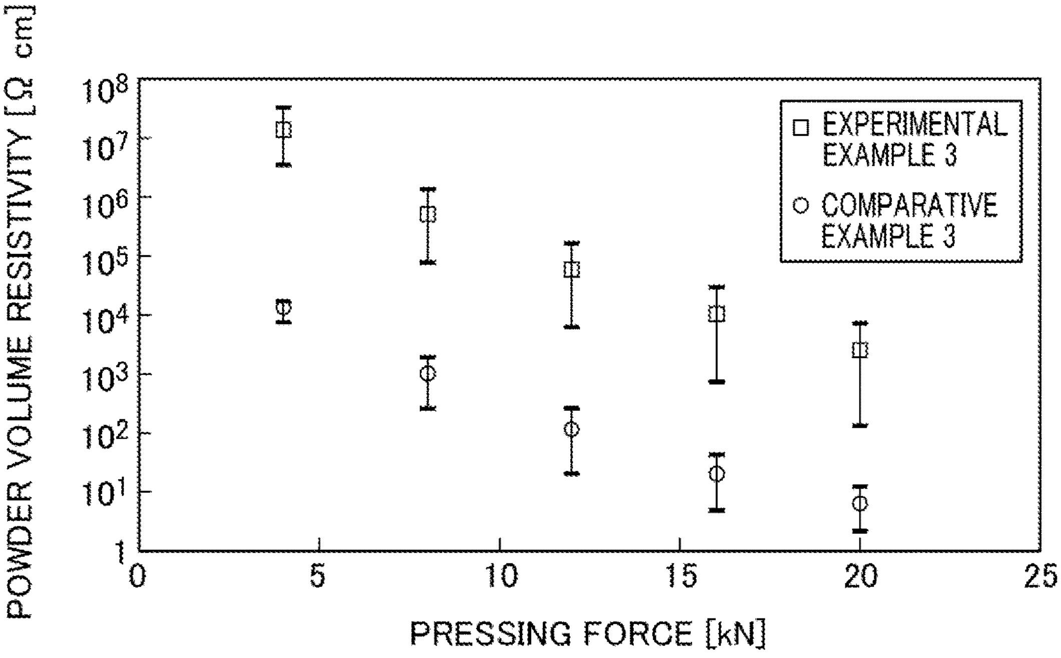
FIG. 7 A graph illustrating the dependence of the volume resistivity of soft magnetic alloy powders on a pressing force.

FIG. 7 is a graph illustrating the dependence of the volume resistivity of alloy powders on a pressing force. FIG. 7 shows measurement data of typical values such as the mean value or median value and the range from the minimum value to the maximum value for Experimental Example 3 and Comparative Example 3. Referring to the drawing, it is observed that the volume resistivity gradually decreases as the pressing force increases, in the measurement data of both Experimental Example 3 and Comparative Example 3. Furthermore, it is also observed that the volume resistivity of Experimental Example 3 is approximately $10^1$ to $10^3$ higher than the volume resistivity of Comparative Example 3.

In this way, the powder alloy of Experimental Example 3 has a higher volume resistivity than the powder alloy of Comparative Example 3. It is thought that this kind of high volume resistivity of Experimental Example 3 is due to the powder alloy of the experimental example prepared according to the production method of the present embodiment having a large ratio of Cr oxide, which has no conductivity, in the Cr of the surface layer. A dust core formed with an alloy powder of the present embodiment, such as that of Experimental Example 3, has a large volume resistivity, and therefore loss due to the generation of eddy current can be reduced.

As described above, an alloy powder of the present embodiment is prepared while oxidizing droplets of molten alloy in a step of forming an alloy powder from a molten alloy by an atomization method in the production method of the present embodiment. The coercive force of such an alloy powder of the present embodiment is smaller than that of comparative examples that do not use the production method of the present embodiment. Furthermore, the ratio of Cr oxide in the Cr in the surface layer of the alloy powder is larger than that of metal Cr. In addition, due to the high circularity of the alloy powder, the decrease in magnetic permeability that accompanies an increase in magnetic field is small, and favorable DC superposition characteristics can be obtained. Moreover, since the ratio of Cr oxide in the Cr in the surface layer of the alloy powder is larger than that of metal Cr, high volume resistivity can be obtained.

A dust core formed using this kind of alloy powder of the present embodiment has a small coercive force and favorable DC superposition characteristics and high magnetic permeability can be ensured, and therefore hysteresis loss can be reduced. Furthermore, since the volume resistivity of the alloy powder is high, loss due to eddy current can also be reduced. In this way, a dust core formed with an alloy powder of the present embodiment can reduce loss regardless of the higher frequencies and larger currents of choke coils, inductors, and the like, and can cope with higher frequencies and larger currents.

INDUSTRIAL APPLICABILITY

The alloy powder and the production method therefor of the present embodiment can be used for producing a dust core for a choke coil, inductor, or the like of an electrical device.

The invention claimed is:

1. A soft magnetic alloy powder that is an Fe—Cr—Si-based soft magnetic alloy powder in which a weight ratio of Cr contained in the soft magnetic alloy powder gradually decreases from a surface of the alloy powder to a predetermined depth in a depth direction, wherein the Fe—Cr—Si-based soft magnetic alloy powder comprises Si in a range of 3 to 6.5% by weight, Cr in a range of 1 to 5% by weight, Mn in a range of 0.01 to 0.1% by weight, and carbon in a range of 0.003 to 0.02% by weight, and an area circularity of the alloy powder is 0.850 or more in a range where a diameter of the alloy powder is 5 μm or more and less than 10 μm.

2. The soft magnetic alloy powder according to claim 1, further comprising at least one of P in a range of 0.001 to 0.009% by weight, S in a range of 0.001 to 0.009% by weight, and O in an amount of 2500 ppm or less by weight.

3. The soft magnetic alloy powder according to claim 1, wherein a weight ratio of Cr oxide/metal Cr gradually decreases from the surface of the alloy powder in the depth direction.

4. The soft magnetic alloy powder according to claim 2, wherein a weight ratio of Cr oxide/metal Cr gradually decreases from the surface of the alloy powder in the depth direction.

5. A production method for the Fe—Cr—Si-based soft magnetic alloy powder of claim 1, the production method comprising:

heating an alloy in a crucible to form a molten metal, the alloy comprising Si in a range of 3 to 6.5% by weight, Cr in a range of 1 to 5% by weight, Mn in a range of 0.01 to 0.1% by weight, and carbon in a range of 0.003 to 0.02% by weight; and blowing a fluid onto a stream of the molten metal guided to fall from the crucible, to crush and solidify the molten metal and form the alloy powder, wherein a portion of Cr contained in the alloy powder is oxidized in forming the alloy powder from the molten metal.

6. The production method according to claim 5, wherein oxidization is performed such that a weight ratio of Cr oxide/metal Cr of the Cr contained in the alloy powder gradually decreases from a surface of the alloy powder in a depth direction.

7. The production method according to claim 5, wherein the alloy further contains at least one of P in a range of 0.001 to 0.009% by weight, S in a range of 0.001 to 0.009% by weight, and O in an amount of 2500 ppm or less by weight.

* * * * *